(12) United States Patent
Malach (10) Patent No.: US 11,297,917 B1
(45) Date of Patent: Apr. 12, 2022

(54) DUAL WIELDING MOBILE DEVICE APPARATUS

(71) Applicant: Anthony Malach, Los Angeles, CA (US)

(72) Inventor: Anthony Malach, Los Angeles, CA (US)

( * ) Notice: Subject to any disclaimer, the term of this patent is extended or adjusted under 35 U.S.C. 154(b) by 0 days.

(21) Appl. No.: 16/921,570

(22) Filed: Jul. 6, 2020

Related U.S. Application Data (63) Continuation-in-part of application No. 16/703,198, filed on Dec. 4, 2019, now Pat. No. 10,764,417.

(51) Int. Cl.
*A45C 11/00* (2006.01)
*A45C 13/04* (2006.01)
*A45C 13/10* (2006.01)

(52) U.S. Cl.
CPC .............. *A45C 11/00* (2013.01); *A45C 13/04* (2013.01); *A45C 13/1069* (2013.01); *A45C 2011/002* (2013.01)

(58) Field of Classification Search
CPC ..... A45C 11/00; A45C 13/04; A45C 13/1069; A45C 2011/002
USPC ....................................................... 455/575.1
See application file for complete search history.

(56) References Cited

U.S. PATENT DOCUMENTS

| 9,762,280 B1 | 9/2017 | Munn | |
| 2008/0187393 A1* | 8/2008 | Nellessen | A63H 3/50 403/345 |
| 2019/0129469 A1 | 5/2019 | Bacallao | |

* cited by examiner

*Primary Examiner* — Eugene Yun
(74) *Attorney, Agent, or Firm* — Sanchelima & Associates, P.A.; Christian Sanchelima; Jesus Sanchelima (57) ABSTRACT

A system for a dual wielding mobile device apparatus including a patch connector assembly is disclosed. The patch connector assembly includes a first patch connector and a second patch connector. Each of the first patch connector and second patch connector are mounted to a rear of mobile devices. First patch connector includes a male member that is received by with a female member of the second patch connector. Thereby allowing for the first patch connector and second patch connector to be secured together along the mobile devices. Each of the first patch connector and second patch connector include magnet portions that extend about an entire perimeter thereof. Received within each of the magnet portions are magnets. The magnets are unaligned and rotated to allow for rotation of the mobile devices to expose the cameras and flashlights on the rear of the mobile devices for usage without obstructions.

5 Claims, 11 Drawing Sheets

DUAL WIELDING MOBILE DEVICE APPARATUS

OTHER RELATED APPLICATIONS

The present application is a continuation-in-part and claims the benefit of the priority date of the pending U.S. patent application Ser. No. 16/703,198, filed on Dec. 4, 2019, which is hereby incorporated by reference.

BACKGROUND OF THE INVENTION

1. Field of the Invention

The present invention relates to a dual wielding mobile device apparatus and, more particularly, to a dual wielding mobile device apparatus that allows for the coupling of multiple mobile devices for allowing a user to comfortably access, use, or transport multiple mobile devices simultaneously in an efficient manner. The convenience of transporting multiple and separate mobile devices also helps to prevent lost or misplaced mobile devices.

2. Description of the Related Art

The dual wielding mobile device apparatus includes a first horizontally adjustable clamping frame having both a bottom plate with integral mounting magnets, and a second horizontally adjustable clamping frame having a bottom plate with integral mounting magnets. Wherein the magnets of the first clamping frame and the second clamping frame are of opposite polarity. The device allows a user to use and transport multiple mobile devices at once comfortably, more specifically, two mobile devices. The device further allows full functionality of the mobile devices, even of the camera. Further, the case allows for carrying of different size mobile devices.

Applicant believes that a related reference corresponds to U.S. published patent application No. 2019/0129469 for a mobile device cradle for interlacing two different mobile devices. Applicant believes another related reference corresponds to U.S. Pat. No. 9,762,280 for portable mobile phone holders and methods for operating at least two mobile phones. None of these, references, however, teach of a dual wielding mobile device apparatus that couples at least two mobile devices together for ease of portability. Further, none of these references teach of the use of magnets which make for quick release of the coupling of the mobile devices. Additionally, the magnets allow for rotation of the mobile devices in relation to one another for the purpose of still being able to use the cameras and flashlight on the mobile devices while using the present invention.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a dual wielding mobile device apparatus that allows for coupling of multiple mobile devices at once, more specifically, of two mobile devices at once.

It is another object of this invention to provide a dual wielding mobile device apparatus that can hold mobile devices of different dimensions.

It is still another object of the present invention to provide a dual wielding mobile device apparatus that permits full functionality of the mobile device, especially the camera and flashlight, even while in the mobile device carrying case.

It is another object of the present invention to provide a dual wielding mobile device apparatus that allows for the simultaneous transportation of multiple mobile devices at once.

It is still another object of the present invention to provide a dual wielding mobile device apparatus that reduces the loss or misplacement of mobile devices.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Referring now to the drawings, where the present invention is generally referred to with numeral 10, it can be observed that it, a dual wielding mobile device apparatus 10, basically includes a clamping frame assembly 20 and a plate assembly 40.

Figure 1:
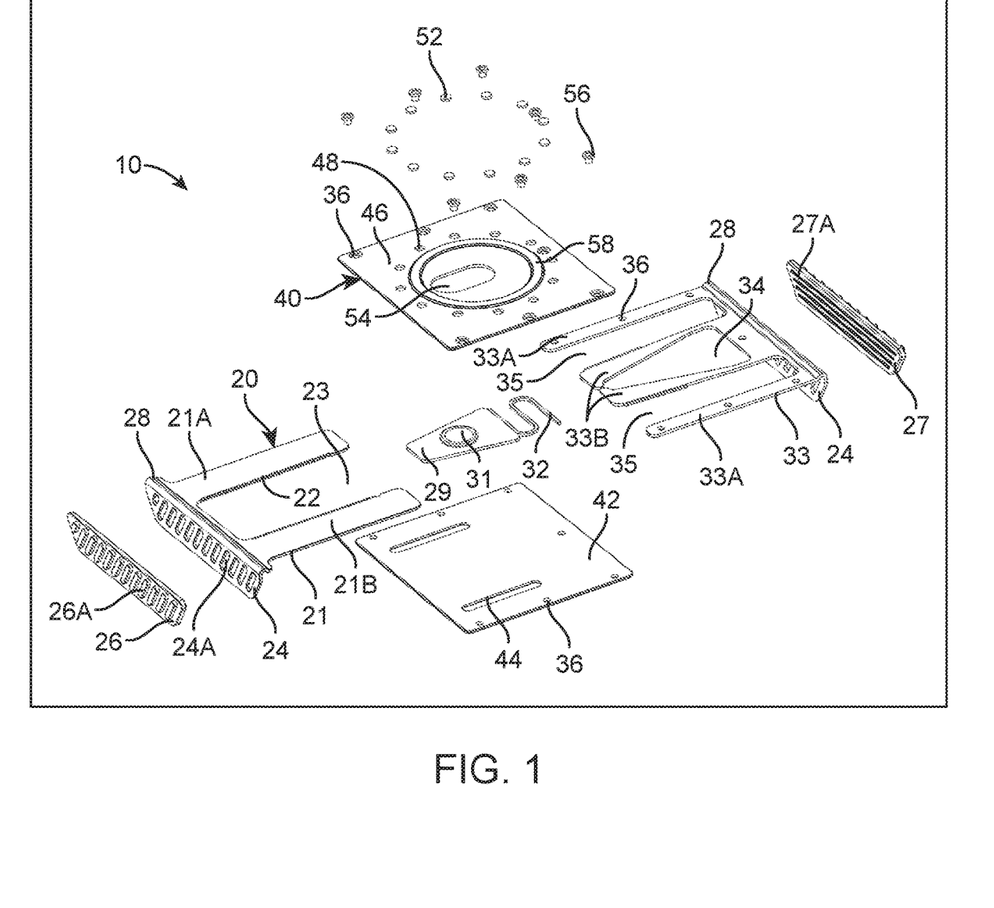
FIG. 1 represents an exploded view of dual wielding mobile device apparatus 10.

It should be understood that dual wielding mobile device apparatus 10 can be sized to accommodate electronic devices of different dimensions. The present invention can be sized for different devices with clamping frame assembly 20. It should be understood that the present invention may include more than one of frame assembly 20 and plate assembly 40. Each of a mobile device 72 may use one of frame assembly 20 and plate assembly 40. Meaning that when two of mobile device 72 are coupled together then the present invention may include two of clamping frame assembly 20 and plate assembly 40. Clamping frame assembly 20 includes a first tray 21. In one embodiment, first tray 21 may be U-shaped. However, it should be understood that first tray 21 may be of predetermined dimensions and shape. It should also be understood that first tray 21 may be made of stainless steel, metal, rubber, plastic or other similar and suitable materials. First tray 21 includes a first leg 21*a* and a second leg 21*b*. First leg 21*a* and second leg 21*b* may be integral to one another. It should be understood that both of first leg 21*a* and second leg 21*b* may be identical but mirrored opposite to one another. First leg 21*a* and second leg 21*b* may have a substantially rectangular shape in one embodiment. Each of first leg 21*a* and second leg 21*b* may have protruding members 21*c* on one side of first leg 21*a* and second leg 21*b*. Protruding members 21*c* may be on an underside of first tray 21. In one embodiment, protruding members 21*c* may have a shape that is cylindrical. Along an inner edge of both first leg 21*a* and second leg 21*b* there may be a plurality of teeth 22 which may be jagged. In one embodiment, each of teeth 22 may be triangular shaped. Teeth 22 on first leg 21*a* may face inwardly towards teeth 22 on second leg 21*b*. A receiving space 23 may be defined as the space between first leg 21*a* and second leg 21*b*.

Mounted to first tray 21 may be a curved portion 28. Curved portion 28 may be adapted to allow for another of curved portion 28 to sit flush atop. Curved portion 28 allows for a closer fitting of additional clamping frame assembly 20 to be mounted flush and in a manner that is aesthetically pleasing. Curved portion 28 may aid to eliminate any space between multiple of clamping frame assembly 20 that are coupled together.

Mounted to curved portion 28 may be a grip holder 24. Grip holder 24 may be of a predetermined shape and dimensions. In one embodiment, grip holder 24 may be substantially rectangular, but taper towards one peripheral side. Extending along a length of grip holder 24 may be a plurality of grip openings 24*a*. Each of grip openings 24*a* may extend a width of grip holder 24. Grip openings 24*a* may be parallel to each other. Grip openings 24*a* may be oriented slanted on grip holder 24. It should be understood that grip openings 24*a* may be of different shapes and sizes as grip holder 24 may be of an irregular shape. Received in grip holder 24 may be a grip 25. Grip 25 may be of a shape and dimensions that cooperate with grip holder 24. Grip 25 may have two sides. Grip 25 may include a grip outer side 26 and a grip inner side 27. On grip outer side 26 may be hand grips 26*a*. Hand grips 26*a* may extend vertically and slanted across the length of grip 25. Hand grips 26*a* may be parallel to one another. Grip openings 24*a* may correspond with hand grips 26*a*. Grip openings 24*a* and hand grips 26*a* may be of dimensions and shapes that cooperate with one another. Grip 25 may be mounted to grip holder 24 by having hand grips 26*a* inserted through grip openings 24*a*. This secures grip 25 to grip holder 24. Hand grips 26*a* may be adapted to provide comfort to a user operating the present invention. Hand grips 26*a* further aid in allowing secure holding of the present invention by the user to reduce the chance of accidental drops. On grip inner side 27 there may be device grips 27*a*. Device grips 27*a* may extend horizontally across the length of grip 25. Device grips 27*a* may be parallel to one another. Device grips 27*a* may be adapted to allow for the present invention to securely hold mobile device 72 to reduce the chances of accidental dropping of mobile device 72. It should be understood that in one embodiment, first tray 21, grip holder 24 and curved portion 28 may be integral. In an alternate embodiment, first tray 21, grip holder 24 and curved portion 28 may be mounted to one another.

Clamping frame assembly 20 may further include a slider 29. Slider 29 may be of a predetermined shape and dimensions. In one embodiment, slider 29 may be tapered as seen in FIG. 1. Slider 29 may have a narrow end and a wide end. Mounted on slider 29 may be a finger receiving portion 31. Mounted to an end of slider 29 may be a spring 32. Spring 32 may be mounted to the end of slider 29 that is wider. Finger receiving portion 31 may be adapted to receive a finger of the user as they slide slider 29 to size the present invention to accommodate different sized of mobile device 72. Slider 29 may be slightly recessed. In one embodiment, finger receiving portion 31 may be circular. Finger receiving portion 31 may include a ring around a circumference of finger receiving portion 31. The ring may be flush with slider 29. Spring 32 may be adapted to expand and compress. In the resting position, spring 32 may be expanded. When slider 29 is actuated spring 32 may be compressed. In one embodiment, as seen in FIG. 1, spring 32 may be S shaped. Slider 29 and spring 32 may be on a same plane.

It can be seen that clamping frame assembly 20 further includes a second tray 33. In one embodiment, second tray 33 may be substantially W shaped. It should be understood that first tray 21, slider 29 and second tray 33 cooperate with one another. Second tray 33 may include outer legs 33*a* and inner legs 33*b*. In one embodiment, outer legs 33*a* and inner legs 33*b* may be integral. The present invention may include two of outer legs 33*a* on the peripheral sides of second tray 33. Outer legs 33*a* may be substantially rectangular shaped, in one embodiment. Outer legs 33*a* may be thinner than first leg 21*a* and second legs 21*b*. At predetermined locations on outer legs 33*a* may be fastener openings 36. In between outer legs 33*a* may be inner legs 33*b*. Inner legs 33*b* may be of an irregular shape that tapers. Inner legs 33*b* may be adapted to move outwardly and inwardly in order to allow sizing of the present invention for different size of mobile device 72. Along outer or outside edges of inner legs 33*b* teeth 22 may extend a predetermined distance along inner legs 33*b*. Teeth 22 on inner legs 33*b* may face outwardly towards one of outer legs 33*a* nearest to each of inner legs 33*b*. Teeth 22 on first leg 21*a* and second leg 21*b* may cooperate with teeth 22 on outer legs 33*b* to have first tray 21 engage second tray 33. The space between inner legs 33*b* may be defined as a slider receiving space 34 adapted to hold slider 29 and spring 32 therebetween. Slider receiving space 34 may be of a shape and dimensions that cooperates with slider 29 and spring 32. There may be a space between each of outer legs 33*a* and inner legs 33*b* that may be defined as a first tray receiving space 35. Thereby meaning that there may be two of first tray receiving space 35 in the present invention. Each of first tray receiving space 35 may receive one of first leg 21*a* or second leg 21*b*. Receiving space 23 may be adapted to receive inner legs 33*b* therebetween. Receiving space 23 and first tray receiving space 35 permit first tray 21 and second tray 33 to engage one another. Once first tray 21 and second tray 33 have engaged one another, teeth 22 on first tray 21 and second tray 33 may engage one another.

It should further be understood that second tray 33 may include grip holder 24, grip 25 and a curved portion just as first tray 21. It should be understood that in one embodiment, second tray 33, grip holder 24 and curved portion 28 may be integral. In an alternate embodiment, second tray 33, grip holder 24 and curved portion 28 may be mounted to one another. Grip outer side 26 on first tray 21 and second tray 33 may face away from one another. While grip inner side 27 on first tray 21 and second tray 33 may face towards one another.

The present invention may further include plate assembly 40. Plate assembly 40 may be adapted to allow coupling of multiple of mobile device 72 together, more specifically of at least two of mobile device 72. Plate assembly 40 includes a top plate 42. Top plate 42 may make contact with mobile device 72 as it is secured by the present invention. It should be understood that mobile device 72 may extend between grip holder 24 of first tray 21 and second tray 33. Top plate 42 may include slots 44. In one embodiment, slots 44 may be parallel to each other. Slots 44 may be of a predetermined shape and dimensions. Slots 44 may also be located on predetermined locations on top plate 42. In one embodiment, slots 44 may be oblong. The present invention may include two of slots 44, but it should be understood that any other number of slots 44 may be suitable. The number of protruding members 21c and slots 44 may corresponds with each other. Each of slots 44 is to receive one of protruding members 21c. Slots 44 may be adapted to receive protruding members 21c of first tray 21. As the present invention is being sized, protruding members 21c may slide along slots 44. In one embodiment, protruding members 21c may slide along slots 44 towards a center of top plate 42 as the present invention is being adapted for smaller of mobile device 72. While, in one embodiment, protruding members 21c may slide along slots 44 away from a center of top plate 42 as the present invention is being adapted for larger of mobile device 72. Top plate 42 may further include fastener openings 36. Fastener openings 36 on top plate 42 may correspond with fastener openings 36 on second tray 33. Plate assembly 40 may also include a bottom plate 46. Bottom plate 46 may include a plurality of magnet openings 48. Magnet openings 48 may be of a predetermined shape and dimensions. It should be understood that magnet openings 48 may be positioned on bottom plate 46 in a circular configuration. Magnet openings 48 are to receive mounting magnets 52 therein. Bottom plate 46 may further include a slider slot 54 towards a center thereof. In one embodiment, slider slot 54 may oblong. Slider slot 54 may be adapted to receive slider 29. Slider 29 may slide along slider slot 54 when engaged by the user in order to size the present invention for different sized of mobile device 72. Bottom plate 46 may also include fastener openings 36. Fastener openings 36 on bottom plate 46 may correspond with fastener openings 36 on second tray 33 and top plate 42. Importantly, bottom plate 46 includes a ring 58. Ring 58 may be centrally located on bottom plate 46. Ring 58 may be recessed or raised on bottom plate 46. Slider slot 54 may be located between ring 58. Magnet openings 48 and mounting magnets 52 may be located around an outside perimeter of ring 58. Once second tray 33, top plate 42 and bottom plate 46 have been aligned, then fasteners 56 may be inserted through the fastener openings 36 located on each in order to secure second tray 33, top plate 42 and bottom plate 46 together. When second tray 33, top plate 42 and bottom plate 46 have been secured together, only first tray 21 may be movable, preferably, inwardly and outwardly for sizing that cooperates with the dimensions of mobile device 72. Inward movement of first tray may make the present invention smaller and outward movement of first tray 21 may make the present invention expand or larger. In an alternate embodiment, fasteners 56 may be grommets.

Figure 2:
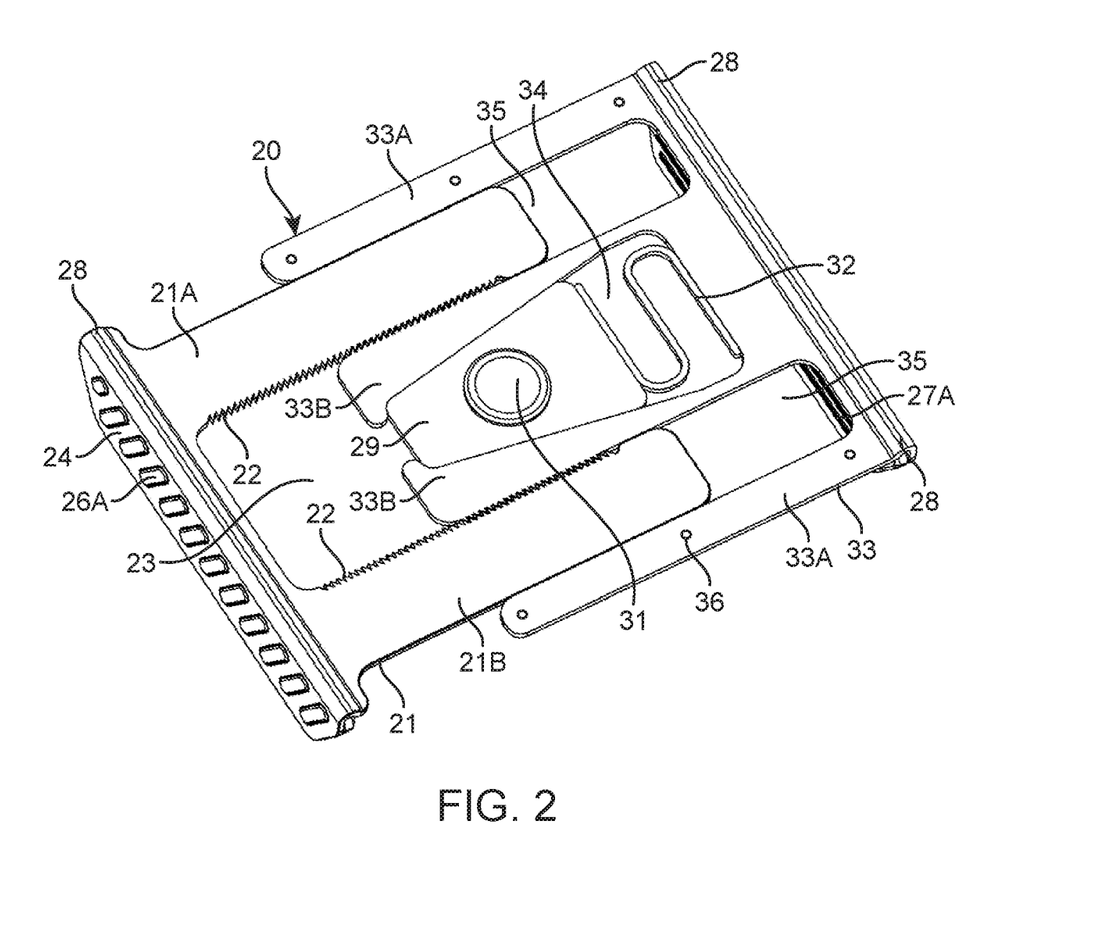
FIG. 2 shows the mechanism that allows dual wielding mobile device apparatus 10 to be sized for gripping different sized mobile devices.
Figure 3:
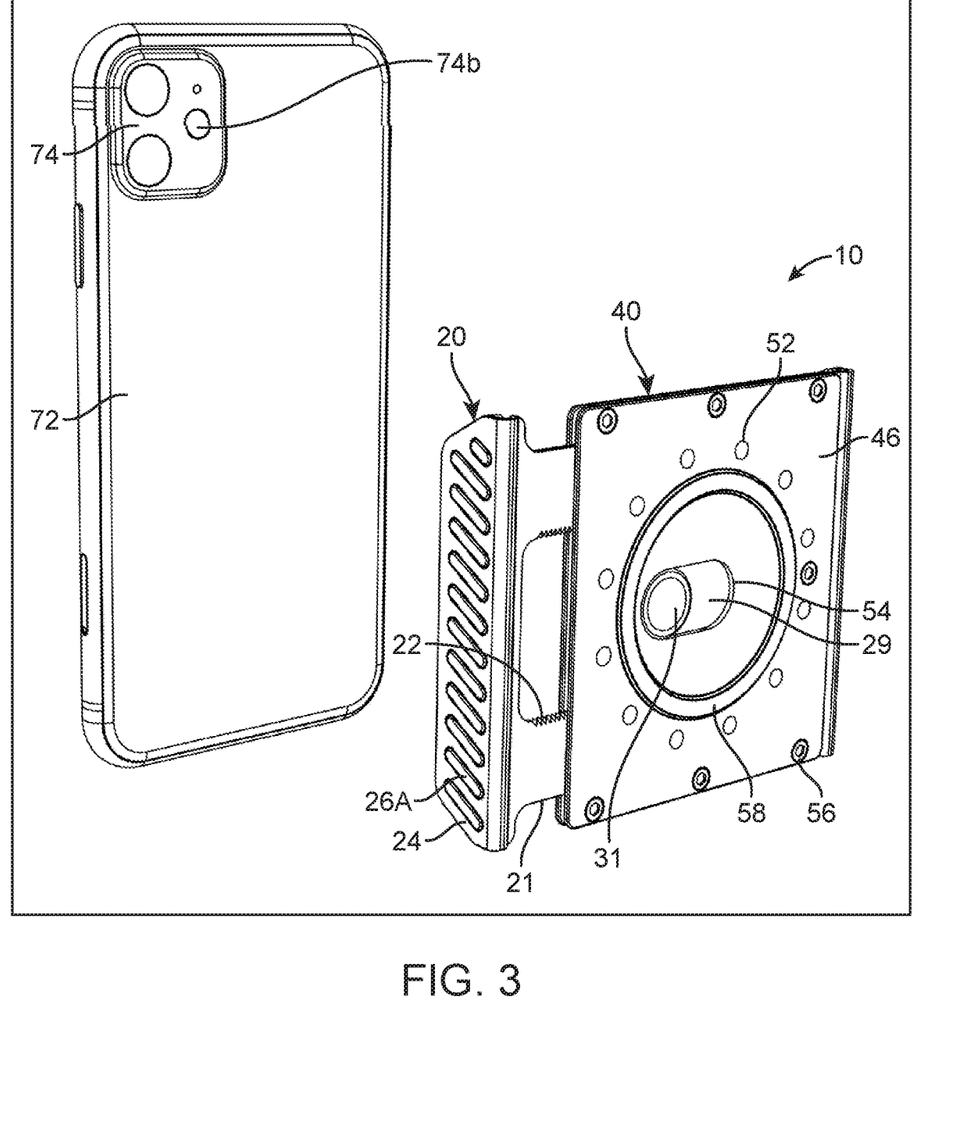
FIG. 3 illustrates dual wielding mobile device apparatus 10 being expanded to grip a mobile device 72.

In order to size the present invention for mobile device 72 of different dimensions clamping frame assembly 20 is may be used. Once clamping frame assembly 20 is fully assembled, teeth 22 on first tray 21 and second tray 33 may be engaged to one another. If the user wishes to expand or retract mounting assembly 20. Slider 29 may be actuated by having the user move finger receiving portion 31 along slider slot 54. This results in slider 29 moving within slider receiving space and spring 32 compressing. The compression of spring 32 allows for teeth 22 of first tray 21 and second tray 33 to disengage as inner legs 33b move inwardly towards one another. Inner legs 33b may come in contact with one another. This then allows for first tray 21 to be slid outwardly to achieve a desired size for mobile device 72. Once the desired size is achieved, finger receiving portion 31 may be released in order for slider 29 to be in a resting position and spring 32 to fully expand. With slider 29 in the resting position, inner legs 33b are separated by slider 29 and pushed outwardly for teeth 22 of outer legs 33a and inner legs 33b to become engaged with one another again to secure the present invention at a required dimension for mobile device 72.

Figure 4:
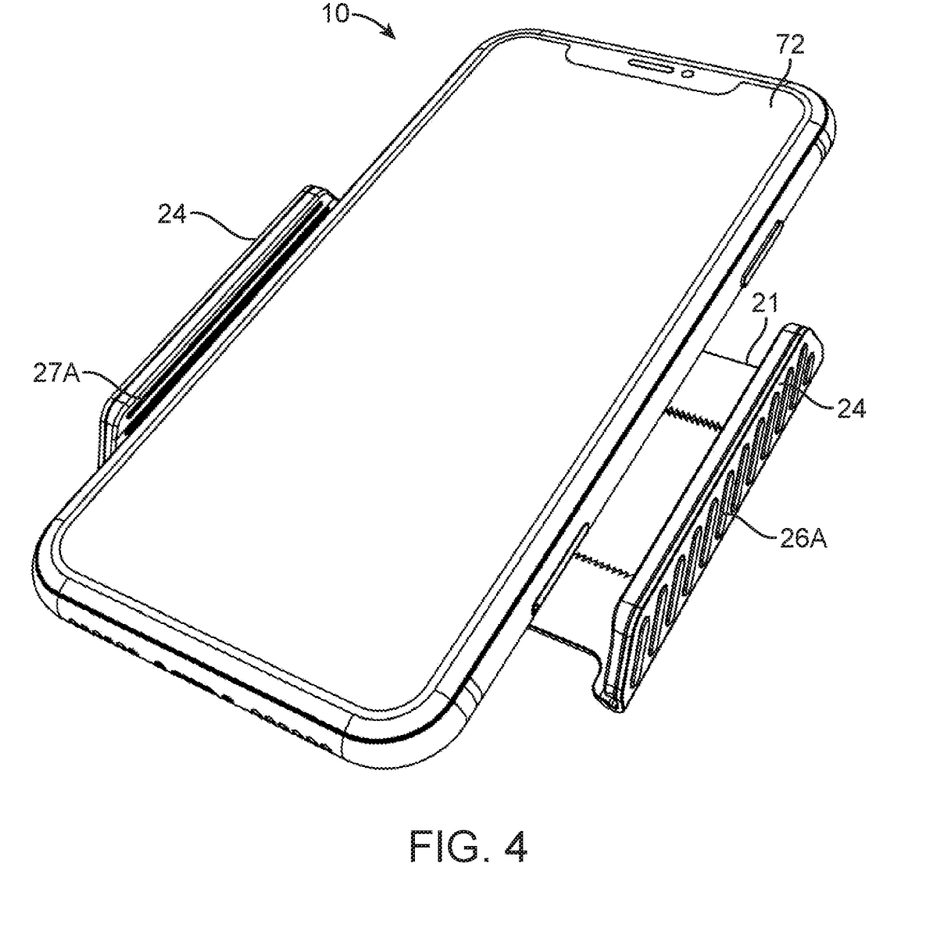
FIG. 4 represents the dual wielding mobile device apparatus 10 gripping a mobile device 72.
Figure 5:
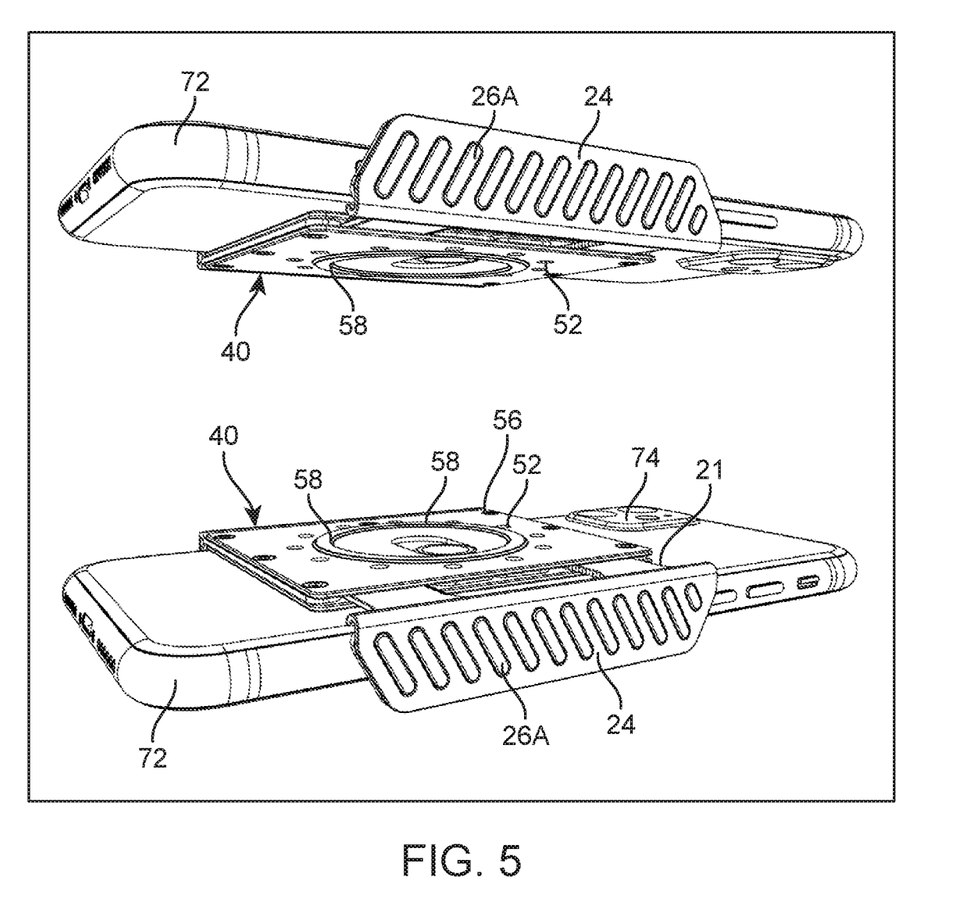
FIG. 5 shows two of mobile device 72 engaged by the clamping frame assembly 20 and aligned to allow for coupling of two of mobile device 72 together.
Figure 8:
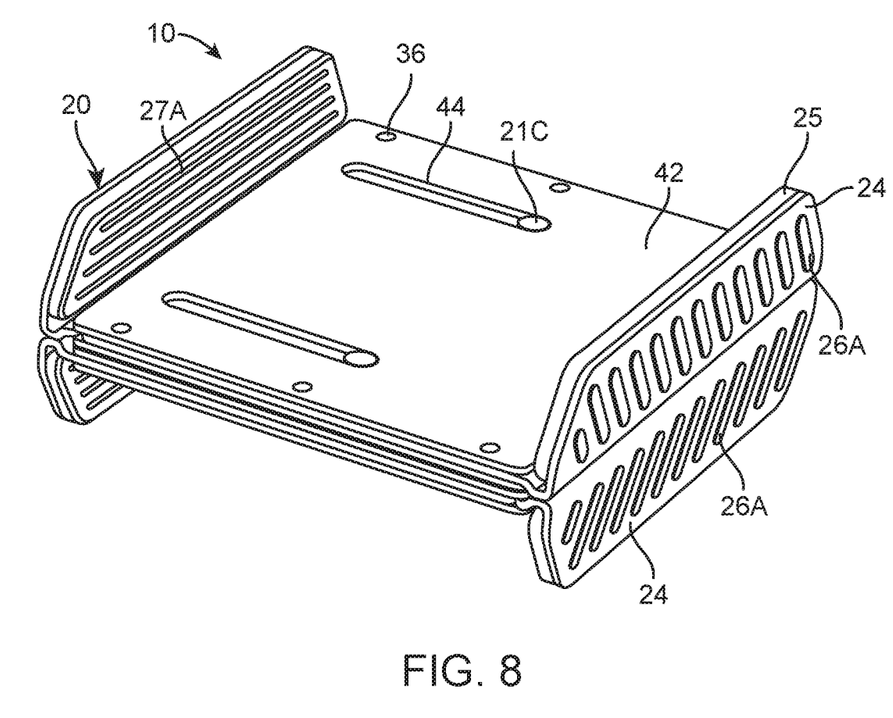
FIG. 8 shows dual wielding mobile device apparatus 10 ready for usage by two mobile devices, before being sized appropriately.

Once the present invention has been assembled, it should be understood that second tray 33, top plate 42 and bottom plate 46 may remain fixed with fasteners 56 and first tray 21 may be movable to allow the present invention to be sized to accommodate different sized of mobile device 72. It should be understood that the present invention may include more than one of clamping frame assembly 20 and plate assembly 40. Each of mobile device 72 requires the use of clamping frame assembly 20 and plate assembly 40. Resulting in the present invention being a dual phone case. Clamping frame assembly 20 and plate assembly 40 for mobile device 72 being a first mobile device is a first horizontally adjustable clamping frame. While another of clamping frame assembly 20 and plate assembly 40 for mobile device 72 being a second mobile device is a second horizontally adjustable clamping frame. First horizontally adjustable clamping frame and second horizontally adjustable clamping frame may engage one another to couple the first mobile device and the second mobile device using mounting magnets 52 being integral mounting magnets located on bottom plate 46. It should be understood that mounting magnets 52 on first horizontally adjustable clamping frame and second horizontally adjustable clamping frame are of opposite polarity. Further, ring 58 on first horizontally adjustable clamping frame may be raised and ring 58 on second horizontally adjustable clamping frame may be recessed or vice versa. Thereby allowing for ring 58 on first horizontally adjustable clamping frame and second horizontally adjustable clamping frame to engage one another.

Figure 6:
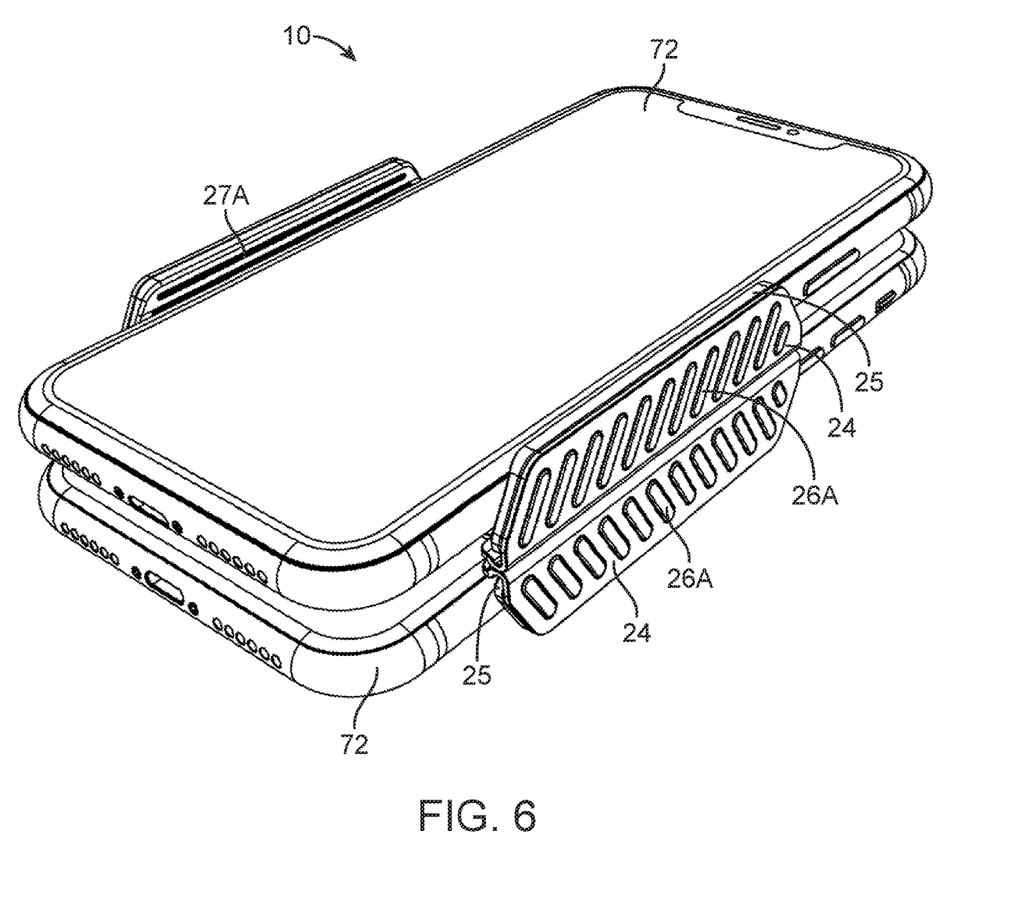
FIG. 6 illustrates two of mobile device 72, of the same size, coupled together by dual mobile device apparatus 10.
Figure 7:
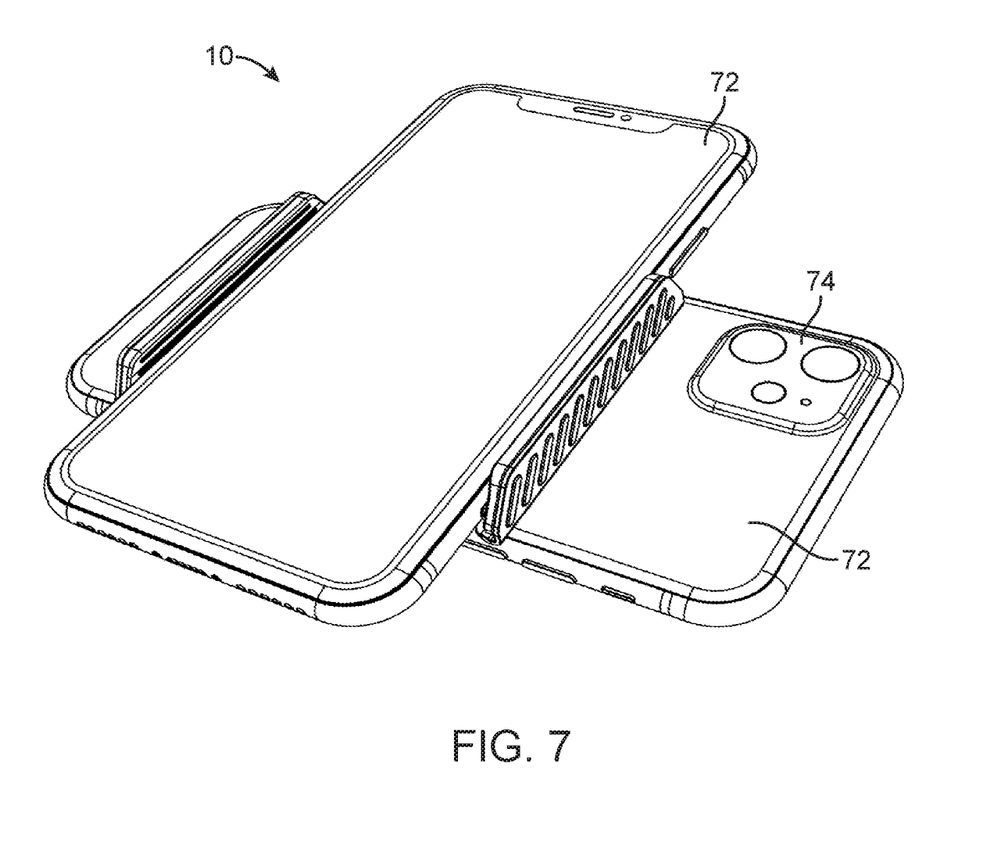
FIG. 7 is a representation of dual wielding mobile device apparatus 10 with one of mobile device 72 secured within dual wielding mobile device apparatus 10 being rotated 90 degrees to allow for the usage of a rear camera on one of two mobile device 72 while remaining coupled to another of mobile device 72.

Once the first horizontally adjustable clamping frame and second horizontally adjustable clamping frame are mounted together with one of mobile device 72 being secured within, first mobile device and second mobile device, respectively, both of mobile devices 72 may be parallel to each other. The present invention allows for each of mobile device 72 to maintain full functionality. In order to use a camera 74 or a flashlight 74b of mobile device 72, the present invention may hold two of mobile device 72 perpendicularly. Camera 74 may preferably be a rear camera or a camera on a rear surface of mobile device 72. For example, mobile device 72 being the first mobile device secured within first horizontally adjustable clamping frame may be vertical while mobile device 72 being the second mobile device secured within second horizontally adjustable clamping frame may be horizontal. This allows for camera 74 and flashlight 74b to be clear of obstructions in order to take pictures as desired. The orientation of one mobile device 72 with respect to another of mobile device 72, is achieved through mounting magnets 48 and ring 58. Both of mobile device 72 start parallel to each other. First horizontally adjustable clamping frame and second horizontally adjustable clamping frame start parallel to each other as. Then when there is a need to use camera 74 or flashlight 74b, one of mobile device 72 may be rotated, preferably about 45 degrees. The rotation of one of mobile device 72 is assisted by mounting magnets 52 and ring 58. One of mobile device 72 is rotated until mounting magnets 52 disengage and mobile device 72 continues to rotate until mounting magnets 52 become engaged once again. During which ring 58 guides the rotation to ensure that engagement takes place once again hence the need for one of ring 58 to be raised and another of ring 58 to be recessed so they are both engaged at all times. It should be understood that mounting magnets 52 allow for orienting of the first mobile device and the second mobile device at predetermined angles in relation to one another.

Figure 9:
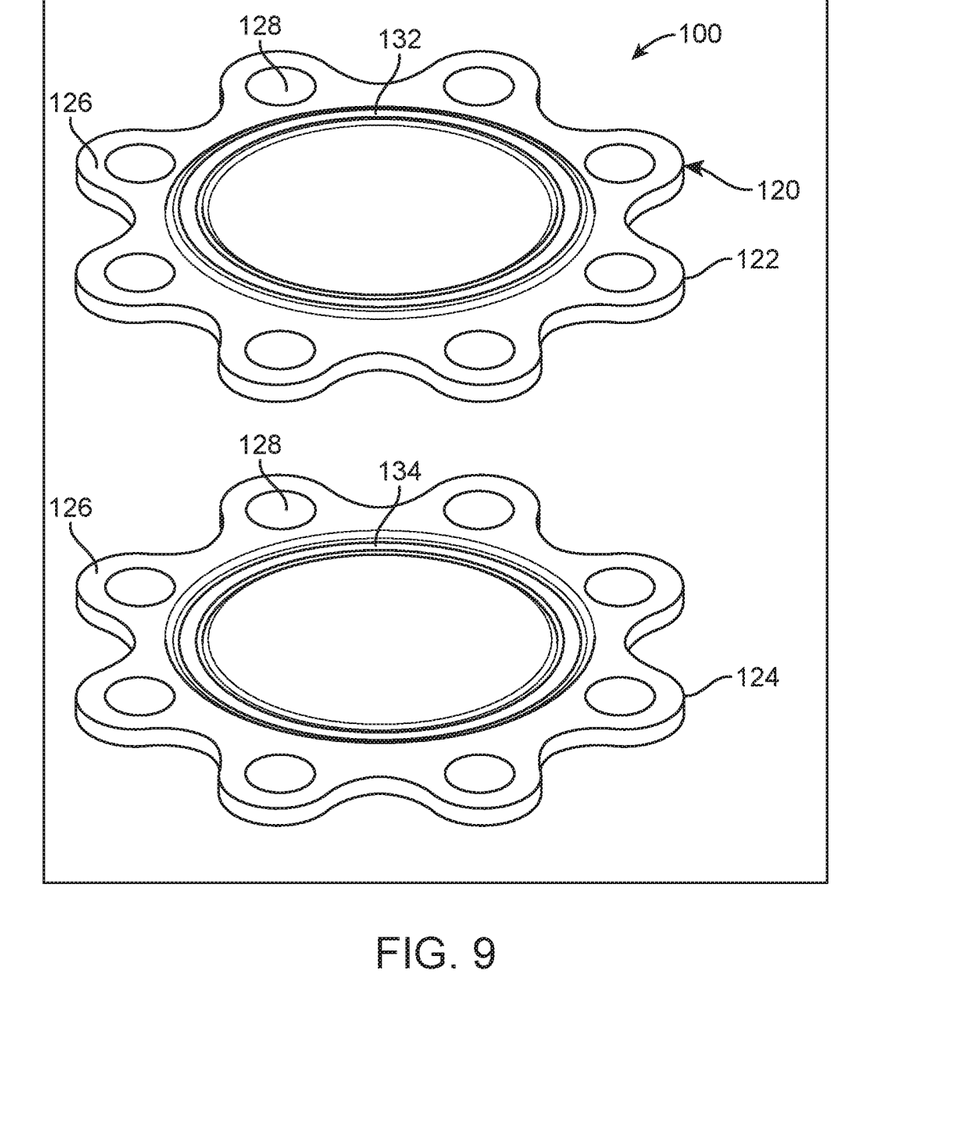
FIG. 9 illustrates an isometric view of dual wielding mobile device apparatus 100 with patch connector assembly 120 having a first patch connector 122 and a second patch connector 124.
Figure 10:
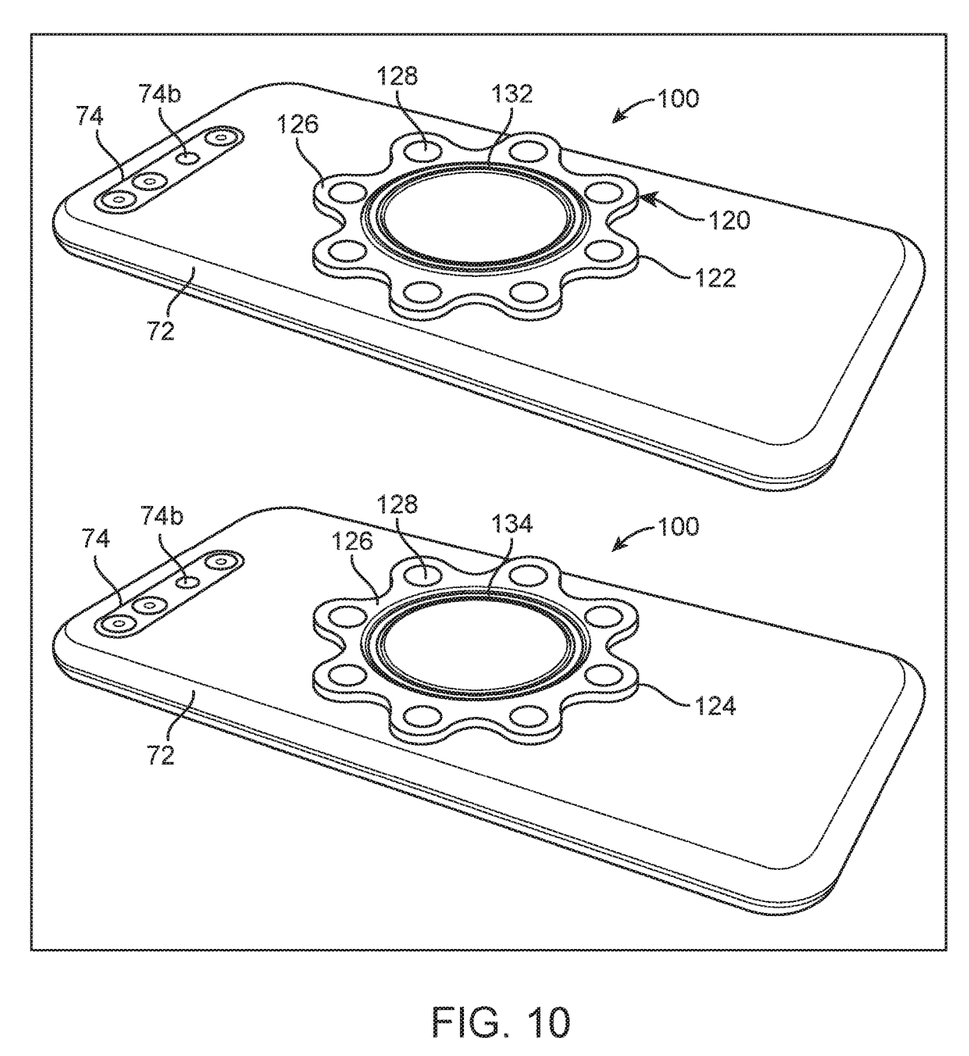
FIG. 10 is a representation of patch connector assembly 120, more specifically, first patch connector 122 mounted to one of mobile device 72 and second patch connector mounted to another of mobile device 72.

In an alternate embodiment, a dual wielding mobile device apparatus 100 may be used to couple at least two of mobile device 72 together. Thereby allowing the user to selectively use camera 74 or flashlight 74b on the coupled mobile devices 72. Importantly, dual wielding mobile device apparatus 100 includes a patch connector assembly 120. Patch connector assembly 120 may include a first patch connector 122 and a second patch connector 124. It is to be understood that first patch connector 122 and second patch connector 124 may be substantially identical in dimensions and shape. It to be understood that each of first patch connector 122 and second patch connector 124 may be made of materials such as stainless steel, metal, rubber, plastic or other similar and suitable materials. First patch connector 122 may be mounted to one of mobile device 72. Second patch connector 124 may be mounted to another of mobile device 72. It is to be understood that first patch connector 122 and second patch connector 124 may preferably be centrally mounted to a rear of each of mobile device 72. Preferably, each of first patch connector 122 and second patch connector 124 may be adhesively mount onto one of mobile device 72. Each of first patch connector 122 and second patch connector 124 may include a rear surface that is covered by an adhesive. To preserve the adhesive on the rear surface of first patch connector 122 and second patch connector 124 a removable protective cover may be attached to the rear surface of the first patch connector 122 and second patch connector 124. The protective cover may be selectively removed to expose the adhesive on the rear surface of each of first patch connector 122 and second patch connector 124 for mounting onto one of mobile device 72.

Each of first patch connector 122 and second patch connector 124 may include magnet portions 126 which extend about the entire perimeter of each of first patch connector 122 and second patch connector 124. Magnet portions 126 may extend outwardly and away from each of first patch connector 122 and second patch connector 124. In one embodiment, magnet portions 126 may be integral with first patch connector 122 and second patch connector 124. Magnet portions 126 may have rounded distal ends, in one embodiment. It is to be understood that magnet portions 126 may be evenly spaced apart. A spacing may be defined between each of magnet portions 126. It is to be understood that the spacing between each of magnet portions 126 may be concave.

Received within each of magnet portions 126 may be magnets 128. It is to be understood that magnets 128 secured to first patch connector 122 may be magnetically attracted to magnets 128 secured to second patch connector when first patch connector 122 is secured to second patch connector 124. Magnets 128 may be flushly secured to magnet portions 126. In one embodiment, each of first patch connector 122 and second patch connector 124 may include eight of magnet portions 126. Thereby resulting in each of first patch connector 122 and second patch connector 124 including eight of magnets 128.

First patch connector 122 may include a male member 132 centrally mounted thereon. Second patch connector 124 may include a female member 134 centrally mounted thereon. Male member 132 and female member 134 may each have a ring like shape and configuration. Male member 132 may protrude and extend outwardly and away from first patch connector 122. Male member 132 may include a flat top face. Female member 134 may be recessed within second patch connector 124. Female member 124 may be a channel. It is to be understood that male member 132 and female member 134 may cooperate with one another. Male member 132 and female member 134 may face away from mobile device 72.

Figure 11:
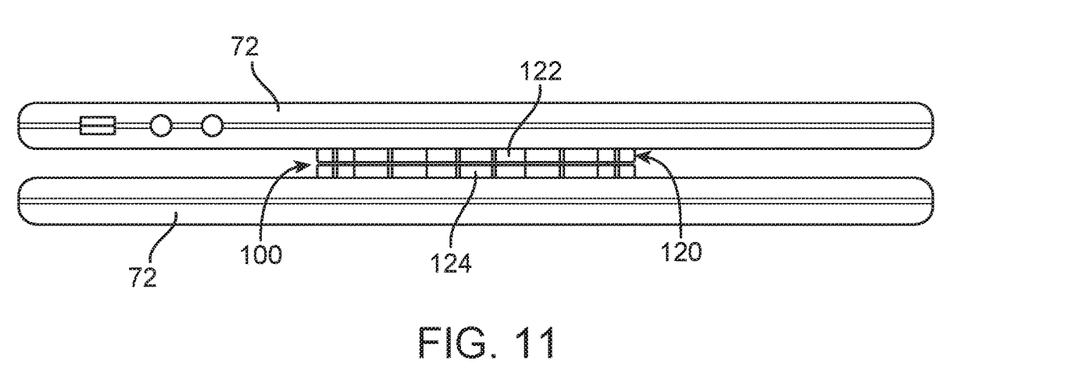
FIG. 11 shows at least two of mobile device 72 coupled together with patch connector assembly 120, wherein first patch connector 122 and second patch connector 124 engage one another.

Once first patch connector 122 and second patch connector 124 have been secured to different of mobile device 72, first patch connector 122 and second patch connector 124 may assist in coupling of the at least two of mobile device 72. To secure at least two of mobile device 72 together, first patch connector 122 and second patch connector 124 may be flushly mounted together. It is to be understood, that male member 132 may be entirely received and engaged by female member 134. Male member 132 and female member 134 may be in constant abutting contact when first patch connector 122 and second patch connector 124 are secured together. Magnets 128 on first patch connector 122 may also engage and cooperate with magnets 128 on second patch connector 124. It is to be understood that magnets 128 assist in maintaining first patch connector 122 and second patch connector 124 to abutting contact with each other. Preferably, when first patch connector 122 and second patch connector 124 are secured together, magnet portions 126 and magnets 128 on first patch connector 122 may be flushly aligned with magnet portions 126 and magnets on second patch connector 124. One of mobile device 72 may be rotated a predetermined amount with another of mobile device 72 secured thereto. This helps to expose camera 74 and flashlight 74b for usage. Rotation of either of mobile device 72 may cause first patch connector 122 and second patch connector 124 to become unaligned such that magnets 128 on first patch connector 122 disengage magnets 128 on second patch connector 124. The rotation of one of mobile device 72 continues until magnets 128 on first patch connector 122 engage magnets 128 on second patch connector 124 again. Preferably, at least two of mobile device 72 may be parallel to each other initially. For usage of camera 74 or flashlight 74b on either of mobile device 72, the at least two of mobile device 72 may be perpendicular to each other. During rotation of either of mobile device 72, it is to be understood that male member 132 and female member 134 may remain in constant abutting contact. Male member 132 may be slidable within female member 134 once one of mobile device 72 is rotated to use camera 74.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a dual wielding mobile device apparatus, comprising:
   a. at least two mobile devices, each of said at least two mobile devices having cameras and flashlights on a rear side thereof; and
   b. a patch connector assembly including a first patch connector and a second patch connector, said first patch connector having same size than said second patch connector, said first patch connector mounted onto a first central portion of one of said at least two mobile devices, said second patch connector mounted to a second central portion of another of said at least two mobile devices, wherein said first patch connector has a first rear surface covered with an adhesive to adhere the first patch connector to one of the at least two mobile devices, wherein said second patch connector has a second rear surface covered with the adhesive to adhere the second patch connector to another of the at least two mobile devices, said first patch connector having a male member centrally located thereon, said second patch connector having a female member mounted thereon, said male member being received by said female member, said male member being rotatable within said female member to allow said first patch connector and said second patch connector to rotate to expose the cameras and the flashlights allowing usage of said cameras and flashlights of said at least two mobile devices without obstructions, wherein said first patch connector and said second patch connector each include magnet portions extending about a perimeter thereof, said magnet portions being evenly spaced apart by a spacing, said spacing being concave, said magnet portions extending outwardly and away from said first patch connector and said second patch connector.

2. The system of claim 1, wherein said male member and said female member each have a circular ring configuration.

3. The system of claim 1 wherein said magnet portions each receive magnets, said magnets on said first patch connector being magnetically attracted to magnets on said second patch connector, said magnets maintaining said first patch connector and said second patch connector in constant abutting contact, said magnets being momentarily disengaged when said first patch connector or said second patch connector are rotated.

4. The system of claim 3 wherein said magnet portions include rounded distal ends, said male member extending outwardly from said first patch connector, said female member being recessed within said second patch connector.

5. A system for a dual wielding mobile device apparatus, consisting of:
   a. at least two mobile devices, each of said at least two mobile devices having cameras and flashlights on a rear side thereof; and
   b. a patch connector assembly including a first patch connector and a second patch connector, said first patch connector having same size than said second patch connector, said first patch connector mounted onto a first central portion of one of said at least two mobile devices, said second patch connector mounted to a second central portion of another of said at least two mobile devices, wherein said first patch connector has a first rear surface covered with an adhesive to adhere the first patch connector to one of the at least two mobile devices, wherein said second patch connector has a second rear surface covered with the adhesive to adhere the second patch connector to another of the at least two mobile devices, said first patch connector having a male member centrally located thereon, said second patch connector having a female member mounted thereon, said male member being received by said female member, said male member being rotatable within said female member to allow said first patch connector and said second patch connector to rotate to expose the cameras and the flashlights allowing usage of said cameras and flashlights of said at least two mobile devices without obstructions, wherein said first patch connector and said second patch connector each include magnet portions extending about a perimeter thereof, said magnet portions being evenly spaced apart by a spacing, said spacing being concave, said magnet portions extending outwardly and away from said first patch connector and said second patch connector, wherein said magnet portions each receive magnets, said magnets on said first patch connector being magnetically attracted to magnets on said second patch connector, said magnets maintaining said first patch connector and said second patch connector in constant abutting contact, said magnets being momentarily disengaged when said first patch connector or said second patch connector are rotated, wherein said magnet portions include rounded distal ends, said male member extending outwardly from said first patch connector, said female member being recessed within said second patch connector, wherein said magnet portions include rounded distal ends, said male member extending outwardly from said first patch connector, said female member being recessed within said second patch connector.

\* \* \* \* \*